(12) United States Patent
Lee

(10) Patent No.: US 12,229,359 B2
(45) Date of Patent: Feb. 18, 2025

(54) DISPLAY DEVICE AND DRIVING METHOD WITH VARIABLE FREQUENCY OF DISPLAY ACCORDING TO FINGERPRINT SENSING

(71) Applicant: Samsung Display Co., LTD., Yongin-si (KR)

(72) Inventor: Soon Gyu Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/176,932

(22) Filed: Mar. 1, 2023

(65) Prior Publication Data
US 2023/0315225 A1 Oct. 5, 2023

(30) Foreign Application Priority Data

Apr. 5, 2022 (KR) .................. 10-2022-0042516

(51) Int. Cl.
*G06F 3/041* (2006.01)
*G06F 3/044* (2006.01)
*G06V 40/13* (2022.01)

(52) U.S. Cl.
CPC ............ *G06F 3/0412* (2013.01); *G06F 3/044* (2013.01); *G06V 40/1306* (2022.01)

(58) Field of Classification Search
CPC .... G06F 3/0412; G06F 3/044; G06V 40/1306
See application file for complete search history.

(56) References Cited

U.S. PATENT DOCUMENTS

| 10,275,094 | B2 | 4/2019 | Kim et al. | |
| 11,295,106 | B2 | 4/2022 | Kim et al. | |
| 2018/0267666 | A1* | 9/2018 | Park | G06V 40/1365 |
| 2018/0348959 | A1* | 12/2018 | Lin | G06F 3/0421 |
| 2019/0042821 | A1* | 2/2019 | Lin | G06V 40/1306 |
| 2020/0026383 | A1* | 1/2020 | Hwang | G06F 3/0446 |
| 2021/0096678 | A1 | 4/2021 | Kubota et al. | |
| 2021/0124447 | A1 | 4/2021 | Jeong | |
| 2021/0232791 | A1* | 7/2021 | Wang | G06F 3/0416 |
| 2021/0247874 | A1* | 8/2021 | Ko | G06F 3/0412 |
| 2023/0152926 | A1* | 5/2023 | Yoshimoto | G06F 3/0412 |
| | | | | 345/175 |

FOREIGN PATENT DOCUMENTS

| KR | 10-2018-0085097 A | 7/2018 |
| KR | 10-2021-0027633 A | 3/2021 |
| KR | 10-2021-0037556 A | 4/2021 |
| KR | 10-2021-0050099 A | 5/2021 |

* cited by examiner

*Primary Examiner* — Liliana Cerullo
(74) *Attorney, Agent, or Firm* — Lewis Roca Rothgerber Christie LLP

(57) ABSTRACT

A display device includes: a display panel including a sensing area having display pixels and sensing pixels; a sensing panel overlapping with the display panel, the sensing panel including sensing electrodes; a fingerprint sensor overlapping with the sensing panel, the fingerprint sensor having light emitting elements of the display pixels and light receiving elements of the sensing pixels; a panel driver configured to drive the display panel; and a sensor driver configured to drive the sensing panel and the fingerprint sensor, wherein the panel driver and the sensor driver are configured to vary a driving mode according to an operation of the fingerprint sensor.

16 Claims, 9 Drawing Sheets

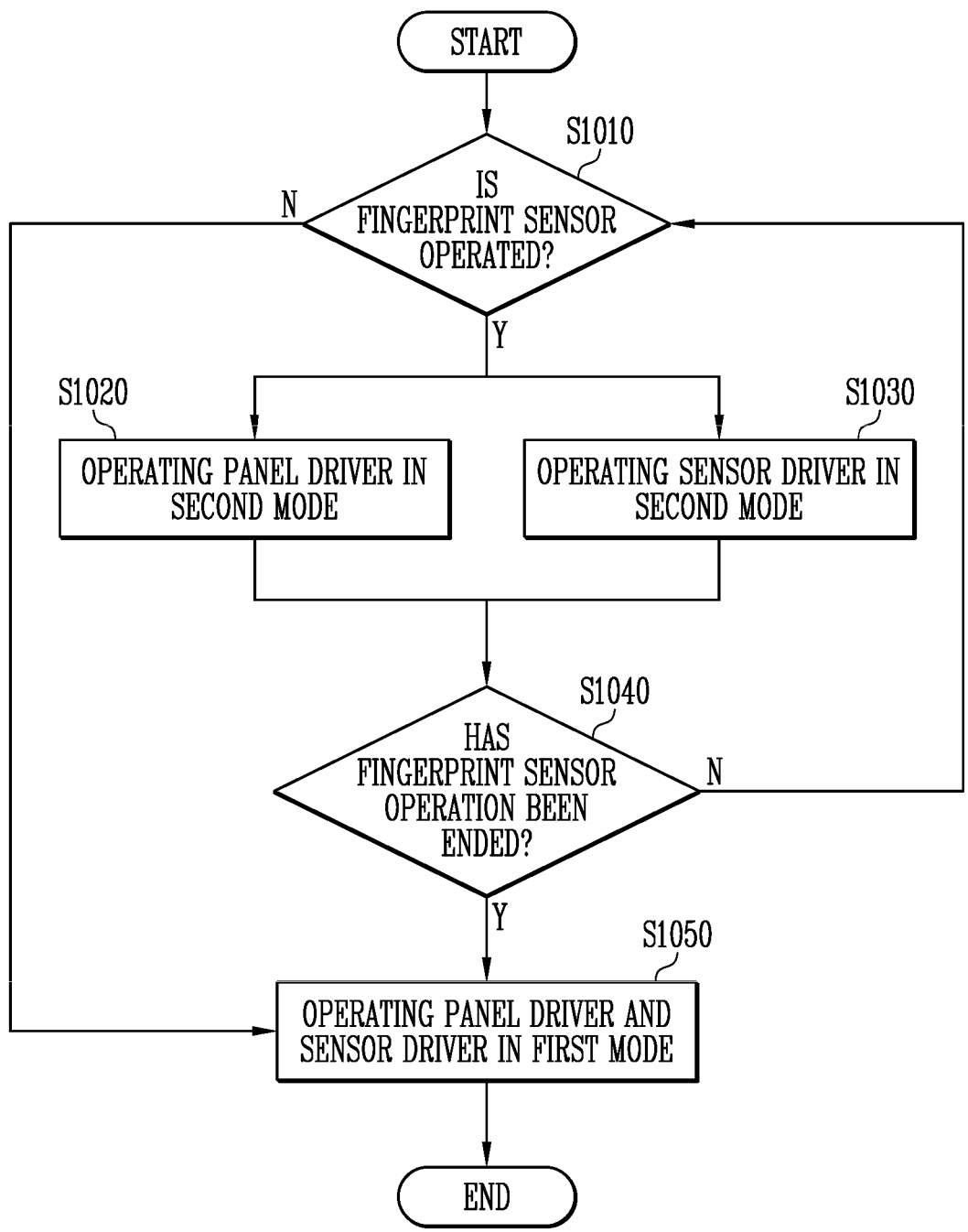

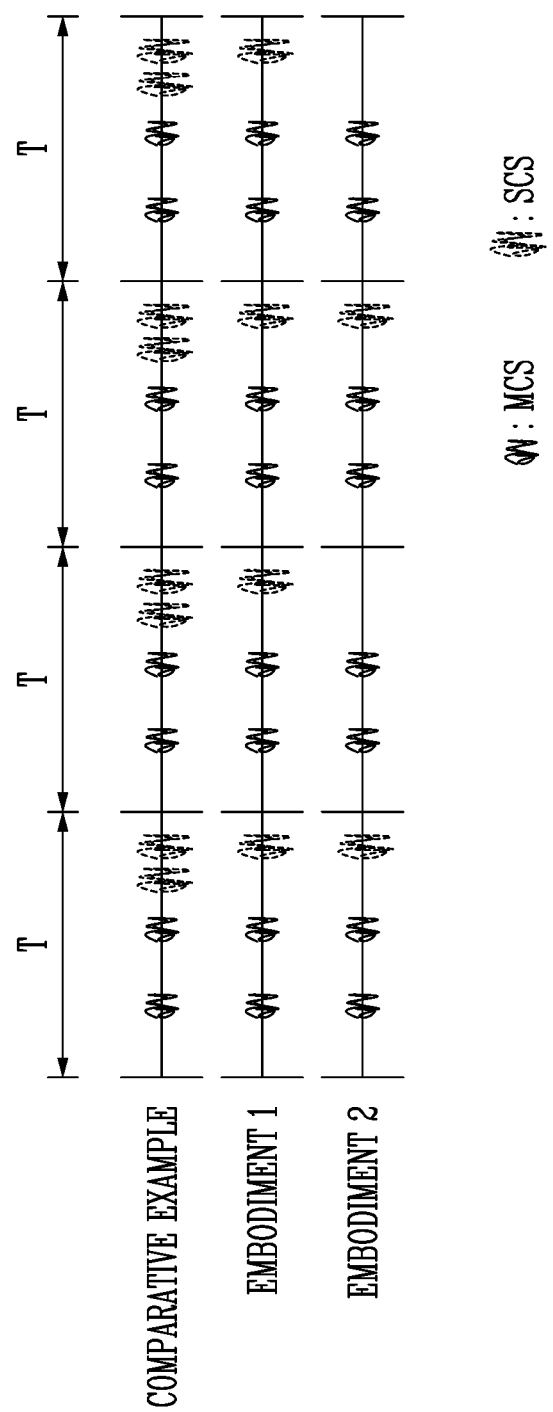

DISPLAY DEVICE AND DRIVING METHOD WITH VARIABLE FREQUENCY OF DISPLAY ACCORDING TO FINGERPRINT SENSING

CROSS-REFERENCE TO RELATED APPLICATION

The present application claims priority to and the benefit of Korean patent application No. 10-2022-0042516 filed on Apr. 5, 2022 in the Korean Intellectual Property Office, the entire disclosure of which is incorporated herein by reference.

BACKGROUND

1. Field

Aspects of some embodiments of the present disclosure generally relate to a display device and a driving method of the same.

2. Description of the Related Art

Recently, as display devices such as smartphones and tablet PCs are used in many different fields, display devices such as smartphones and wearable devices, in which a fingerprint sensor for sensing a fingerprint of a user is incorporated, have been widely used.

In order to provide a fingerprint sensing function, a fingerprint sensor may be built in or attached to a display device. For example, a photosensitive type fingerprint sensor may include a light source and a photo sensor. The photo sensor may acquire fingerprint information by receiving reflected light or the like, generated by a fingerprint of a user.

The above information disclosed in this Background section is only for enhancement of understanding of the background and therefore the information discussed in this Background section does not necessarily constitute prior art.

SUMMARY

Aspects of some embodiments include a display device capable of driving a sensing panel and a fingerprint sensor in a first mode or a second mode, and a driving method of the display device.

According to some embodiments of the present disclosure, a display device includes: a display panel including a sensing area having display pixels and sensing pixels; a sensing panel overlapping with the display panel, the sensing panel including sensing electrodes; a fingerprint sensor overlapping with the sensing panel, the fingerprint sensor being configured with light emitting elements of the display pixels and light receiving elements of the sensing pixels; a panel driver configured to drive the display panel; and a sensor driver configured to drive the sensing panel and the fingerprint sensor. According to some embodiments, the panel driver and the sensor driver may vary a driving mode according to an operation of the fingerprint sensor.

According to some embodiments, when the fingerprint sensor is not operated, the panel driver may drive the display panel at a variable frequency according to an image displayed on the display panel.

According to some embodiments, when the fingerprint sensor is operated, the panel driver may drive the display panel at a fixed frequency.

According to some embodiments, when the fingerprint sensor is operated, the panel driver may drive only a partial area of the display panel at a fixed frequency.

According to some embodiments, when the fingerprint sensor is not operated, the sensor driver may drive the sensing panel in a self-capacitance manner and a mutual capacitance manner.

According to some embodiments, when the fingerprint sensor is not operated, the sensor driver may output, to the sensing panel, an initial signal for searching whether or not a pen exists.

According to some embodiments, when the fingerprint sensor is not operated, the sensor driver may output a driving signal to the fingerprint sensor to correspond to a frame frequency of the display panel.

According to some embodiments, when the fingerprint sensor is operated, the sensor driver may drive the sensing panel in a mutual capacitance manner.

According to some embodiments, when the fingerprint sensor is operated, the sensor driver may drive the sensing panel in a mutual capacitance manner and a self-capacitance manner by changing a sensing cycle of the self-capacitance manner.

According to some embodiments, when the fingerprint sensor is operated, the sensor driver may not output, to the sensing panel, any initial signal for searching whether or not a pen exists.

According to some embodiments, when the fingerprint sensor is operated, the sensor driver may output a driving signal corresponding to a fixed frequency to the fingerprint sensor.

According to some embodiments of the present disclosure, in a method of driving a display device including a display panel including a sensing area having display pixels and sensing pixels, a sensing panel which overlaps with the display panel and includes sensing electrodes, and a fingerprint sensor which overlaps with the sensing panel and is configured with light emitting elements of the display pixels and light receiving elements of the sensing pixels, the method includes: determining whether or not the fingerprint sensor is operated; driving the display panel, the sensing panel, and the fingerprint sensor in a first mode, when the fingerprint sensor is not operated; and driving the display panel, the sensing panel, and the fingerprint sensor in a second mode, when the fingerprint sensor is operated.

According to some embodiments, in the first mode, the display panel may be driven at a variable frequency according to an image displayed on the display panel.

According to some embodiments, in the first mode, the sensing panel may be driven in a self-capacitance manner and a mutual capacitance manner.

According to some embodiments, in the first mode, a driving signal may be output to the fingerprint sensor to correspond to a frame frequency of the display panel.

According to some embodiments, in the second mode, the display panel may be driven at a fixed frequency.

According to some embodiments, in the second mode, a partial area of the display panel may be only driven at a fixed frequency.

According to some embodiments, in the second mode, the sensing panel may be driven in a mutual capacitance manner.

According to some embodiments, in the second mode, any initial signal for searching whether or not a pen exists may not be output to the sensing panel.

According to some embodiments, in the second mode, a driving signal corresponding to a fixed frequency may be output to the fingerprint sensor.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 10 is a flowchart illustrating an example of a driving method of the display device according to some embodiments of the present disclosure.

FIG. 11 illustrates frequencies of mutual capacitance driving signals and self-capacitance driving signals, which sensor drivers in accordance with a comparative example and embodiments provide to a sensing panel, when a fingerprint sensor is operated.

DETAILED DESCRIPTION

The present disclosure may apply various changes and different shape, therefore only illustrate in details with particular examples. However, the examples do not limit to certain shapes but apply to all the change and equivalent material and replacement. The drawings included are illustrated a fashion where the figures are expanded for the better understanding.

It will be understood that, although the terms "first," "second", etc. may be used herein to describe various elements, these elements should not be limited by these terms. These terms are only used to distinguish one element from another element. Thus, a "first" element discussed below could also be termed a "second" element without departing from the teachings of the present disclosure. As used herein, the singular forms are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof. Further, an expression that an element such as a layer, region, substrate or plate is placed "on" or "above" another element indicates not only a case where the element is placed "directly on" or "just above" the other element but also a case where a further element is interposed between the element and the other element. On the contrary, an expression that an element such as a layer, region, substrate or plate is placed "beneath" or "below" another element indicates not only a case where the element is placed "directly beneath" or "just below" the other element but also a case where a further element is interposed between the element and the other element.

Hereinafter, a display device according to some embodiments of the present disclosure will be described in detail with reference to the accompanying drawings.

Figure 1:
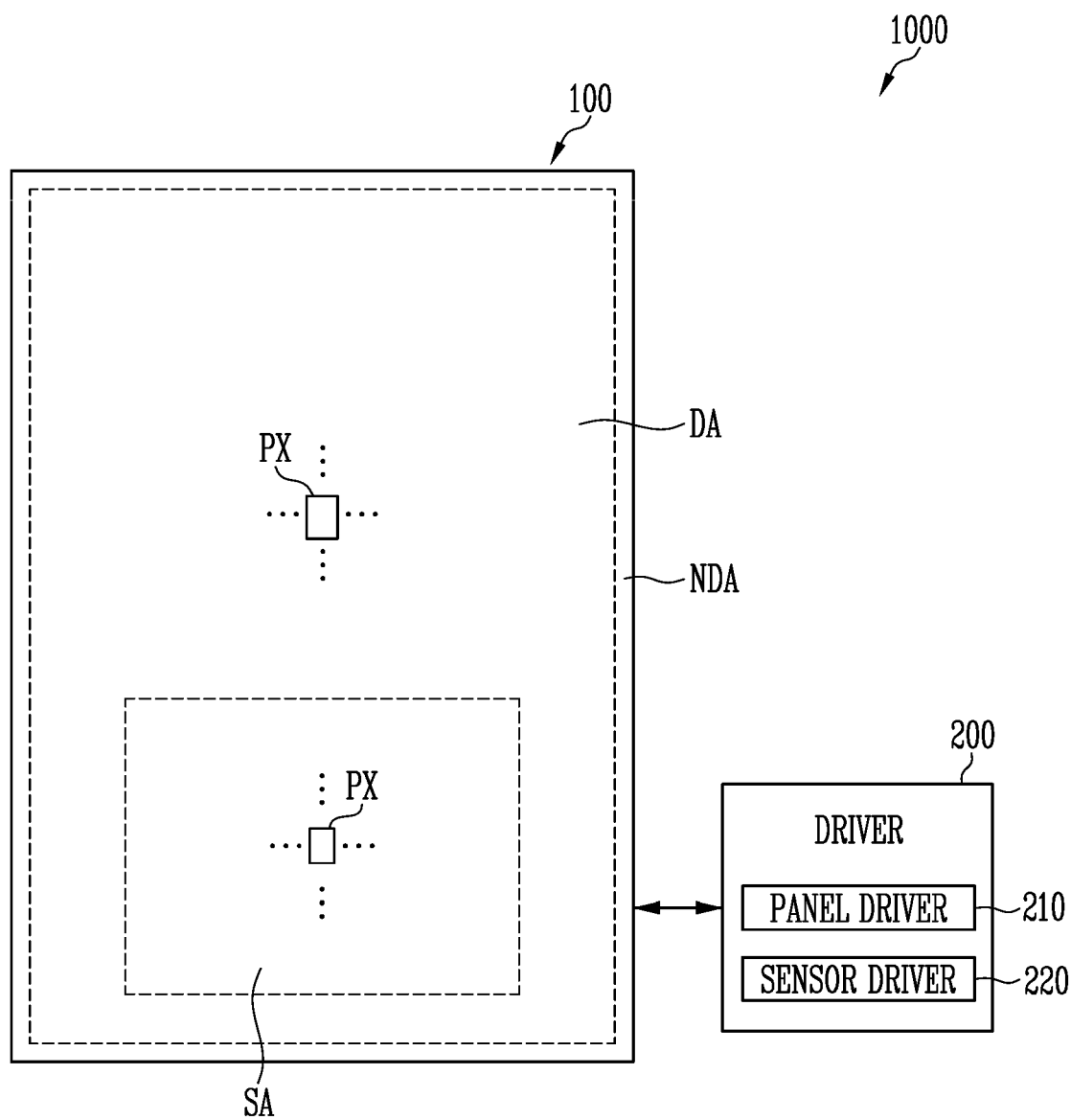
FIG. 1 is a block diagram illustrating a display device according to some embodiments of the present disclosure.
Figure 2:
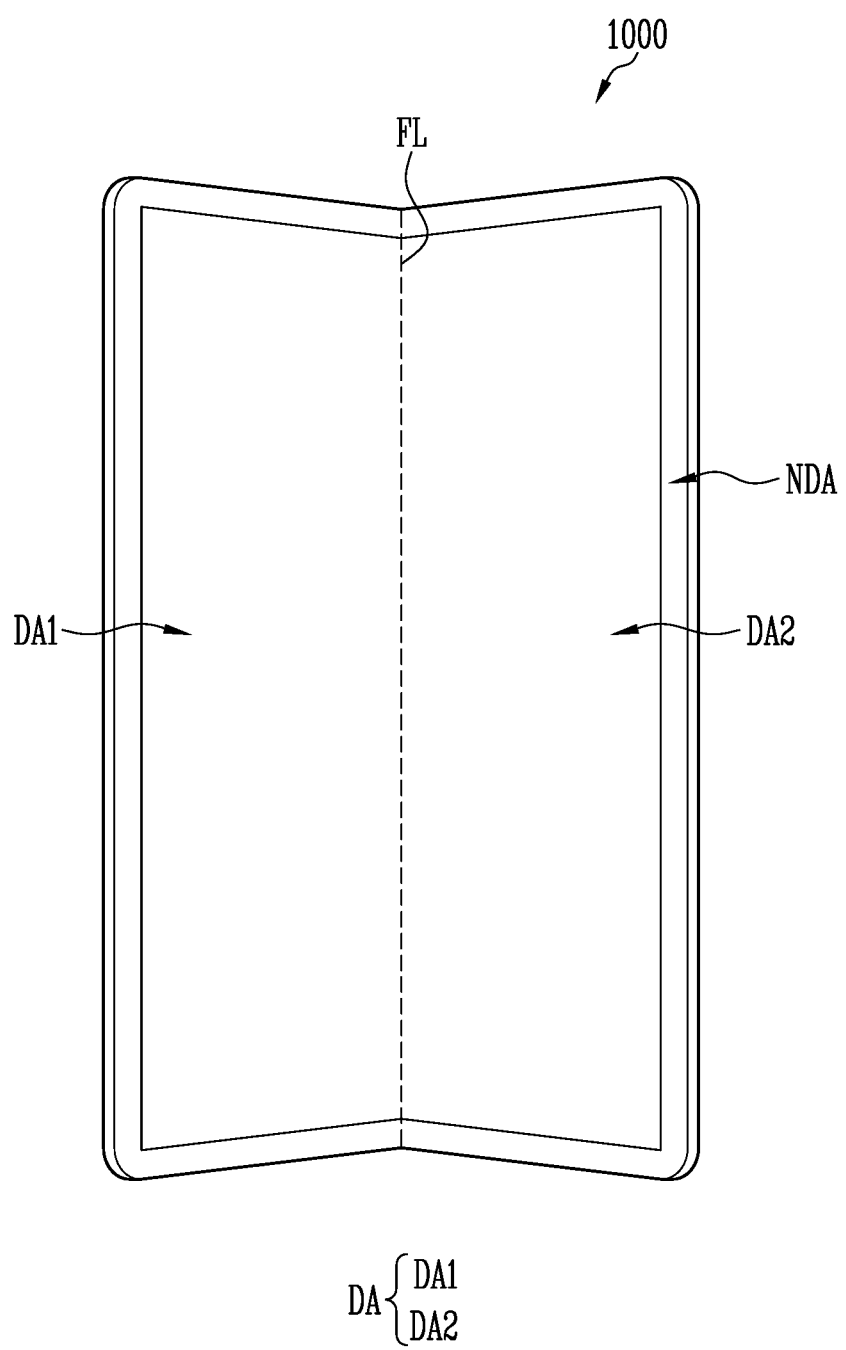
FIG. 2 is a perspective view illustrating an example of a display device according to some embodiments of the present disclosure.
Figure 3:
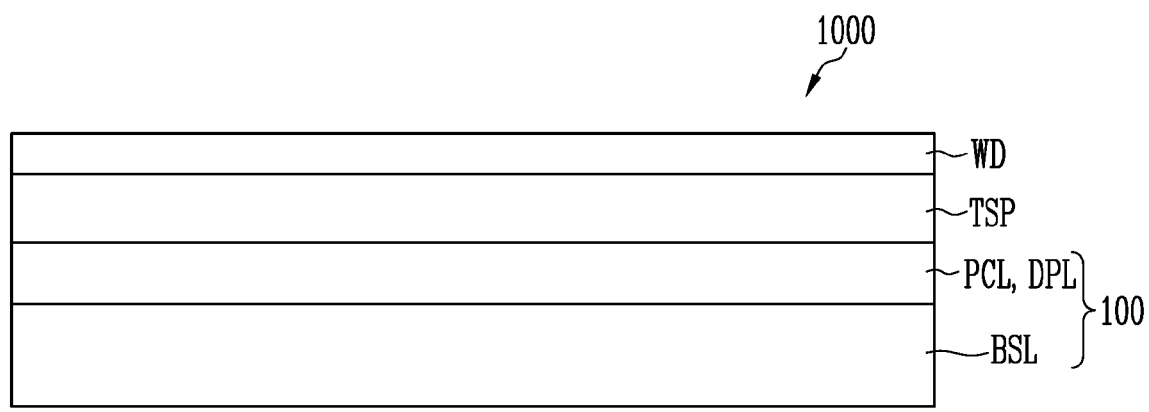
FIG. 3 is a schematic sectional view of a display according to some embodiments of the present disclosure.

FIG. 1 is a block diagram illustrating a display device according to some embodiments of the present disclosure. FIG. 2 is a perspective view illustrating an example of a display device according to some embodiments of the present disclosure. FIG. 3 is a schematic sectional view of a display device according to some embodiments of the present disclosure.

Referring to FIG. 1, the display device 1000 according to some embodiments of the present disclosure may include a display panel 100 and a driver 200. Referring to FIG. 2, the display device 1000 according to some embodiments of the present disclosure may be a foldable display device including a flexible base layer, a flexible window, and the like.

The display panel 100 (or the display device 1000) may include a display area DA and a non-display area NDA. The display area DA is an area in which pixels PX are provided, and may display an image. Each of the pixels PX may include at least one light emitting element, and the pixels PX may emit light, corresponding to image data input from the outside.

The non-display area NDA is an area located at the periphery of the display area DA, and may be an area in which any image is not displayed. A line, a pad, and the like, which apply a signal, power, and the like to the pixels PX.

The display area DA may include a first display area DA1 and a second display area DA2, which can face each other with respect to a folding line FL. The first display area DA1 and the second display area DA2 may be provided to have the same area with which the first display area DA1 and the second display area DA2 can overlap with each other. However, embodiments according to the present disclosure are not limited thereto, and the first display area DA1 and the second display area DA2 may be provided to have different areas with which the first display area DA1 and the second display area DA2 can overlap with each other. The display area NDA may be provided to surround the display area DA.

According to some embodiments, the display area DA may include a sensing area SA. The sensing area SA may overlap with at least one pixel PX among the pixels PX provided in the display area DA. Accordingly, pixels PX may be located in the sensing area SA. Although one sensing area SA having a size smaller than a size of the display area DA is illustrated in FIG. 1, embodiments according to the present disclosure are not limited thereto. The sensing area SA may be implemented with the same size as the display area DA. A plurality of sensing areas SA arranged regularly or irregularly may be included in the display area DA. In addition, according to some embodiments, a relationship between the display area and the sensing area, described with reference to FIG. 1, may be applied.

The sensing area SA may include a sensing panel (or touch sensor), and sense an input of the user, which is provided from the outside by the sensing panel. For example, the input of the user may correspond to a finger, a stylus pen, or the like. That is, the sensing area SA may sense a pressure, a position, and the like of the finger, and sense a pressure, a position, and the like of the stylus pen. A structure of the sensing panel will be described in detail with reference to FIG. 5.

The sensing area SA may further include sensing pixels. The sensing pixels may be implemented with a photo sensor for sensing light. For example, the photo sensor may be an organic photo diode. The sensing pixels may be overlap with the pixels PX or be located at the periphery of the pixels PX. For example, at least some of the sensing pixels may be arranged to overlap with the pixels PX, and be located between the pixels PX. According to some embodiments, the sensing pixels and the pixels PX may have sizes equal to or different from each other. The relative sizes and arrangements between the sensing pixels and the pixels PX may be variously modified.

According to some embodiments, the sensing pixels along with the light emitting elements provided in the pixels PX may constitute a photosensitive type fingerprint sensor. When the display device having the fingerprint sensor built therein is configured by using the pixels PX as light sources without any separate external light source, the module thickness of the photosensitive type fingerprint sensor and the display device including the same can be decreased, and manufacturing cost can be reduced.

The driver 200 may include a panel driver 210 and a sensor driver 220.

Each of the panel driver 210 and the sensor driver 220 may be implemented as an integrated circuit to be mounted on a flexible circuit board. The panel driver 210 may be electrically connected to the display panel 100 through the flexible circuit board, and the sensor driver 220 may be electrically connected to the sensing pixels of the display panel 100 through the flexible circuit board.

The panel driver 210 may sequentially scan the pixels PX of the display area DA and supply a data signal corresponding to image data to the pixels PX. Accordingly, the display panel 100 can display an image corresponding to the image data.

The panel driver 210 may drive the display panel 100 in a first mode or a second mode according to whether or not the fingerprint sensor is operated.

For example, when the fingerprint sensor is not operated, the panel driver 210 may drive the display panel 100 at a variable frequency according to an image displayed on the display panel 100. For example, the panel driver 210 may drive the display panel 100 such that an image is displayed on the display panel 100 at a frame frequency of 30 Hz, 60 Hz, 120 Hz, 240 Hz, or the like. That the panel driver 210 drives the display panel 100 at the variable frequency is referred to as driving in the first mode.

When the fingerprint sensor is operated, the panel driver 210 may drive the display panel 100 at a fixed frequency. For example, the panel driver 210 may drive the display panel 100 such that an image is displayed on the display panel at a frame frequency of 60 Hz. That the panel driver 210 drives the display panel 100 at the fixed frequency may be referred to as driving in the second mode.

When the fingerprint sensor is operated, the panel driver 210 may drive only a partial area of the display panel 100 at the fixed frequency. For example, the panel driver 210 may drive the first display area DA1 shown in FIG. 2 in the second mode. The panel driver 210 may drive the second display area DA2 shown in FIG. 2 in the first mode.

That is, according to some embodiments, when the fingerprint sensor is operated, the panel driver 210 drives the display panel 100 in the second mode. Accordingly, an operating time of the fingerprint sensor can be sufficiently secured, and noise with respect to a fingerprint detection result can be reduced. Thus, the display device according to some embodiments of the present disclosure can drive the display panel 100 in the first mode or the second mode, if necessary, and hence the fingerprint sensor can be optimally operated.

The sensor driver 220 may output a driving signal for driving the sensing panel, the sensing pixel, or the like, and receive a sensing signal received from the sensing panel, the sensing pixel, or the like. The sensor driver 220 may sense an input of a user by using received electrical signals, and detect a fingerprint shape of the user. For example, the sensor driver 220 may sense an input of the user from the sensing panel, and detect a fingerprint shape of the user from the sensing pixel.

The sensor driver 220 may drive the sensing panel and the sensing pixel (or the fingerprint sensor) in the first mode or the second mode according to whether or not the fingerprint sensor is operated.

For example, when the fingerprint sensor is not operated, the sensor driver 220 may drive the sensing panel in a self-capacitance manner and a mutual capacitance manner. Also, when an input of a pen (or stylus pen) is provided, the sensor driver 220 may output, to the sensing panel, an initial signal (e.g., an uplink signal) for searching or identifying whether or not the pen (or stylus pen) exists or is in proximity to the display panel 100. Also, the sensor driver 220 may output a driving signal of the fingerprint sensor to correspond to the frame frequency of the display panel 100. For example, the sensor driver 220 may output the driving signal of the fingerprint sensor at a frequency corresponding to twice of the frame frequency. That the sensor driver 220 drives the sensing panel and the fingerprint sensor in this manner may be referred to as driving in the first mode.

When the fingerprint sensor is operated, the sensor driver 220 may drive the sensing panel in the mutual capacitance manner. However, embodiments according to the present disclosure are not limited thereto. According to some embodiments, the sensor driver 220 may drive the sensing panel in the mutual capacitance manner and the self-capacitance manner by changing a sensing cycle of the self-capacitance manner. This driving method will be described below with reference to FIG. 11. Also, the sensor driver 220 may not output, to the sensing panel, the initial signal for searching whether or not the pen (or stylus pen) exists. Also, the sensor driver 220 may output a driving signal corresponding to the fixed frequency to the fingerprint sensor. For example, the sensor driver 220 may output a driving signal having the frequency of 60 Hz to the fingerprint sensor. However, embodiments according to the present disclosure are not limited thereto. According to some embodiments, when the fingerprint sensor is operated, a frequency at which the sensor driver 220 outputs the driving signal to the fingerprint sensor may be variously modified in a range in which the frequency is lower than a frequency when the fingerprint sensor is not operated. That the sensor driver 220 drives the sensing panel and the fingerprint sensor in this manner may be referred to as driving in the second mode.

That is, according to some embodiments, when the fingerprint sensor is driven, the sensor driver 220 drives the sensing panel and the fingerprint sensor. Accordingly, noise with respect to a fingerprint detection result can be reduced, and the accuracy of the fingerprint detection result can be improved. Thus, the display device according to some embodiments of the present disclosure can drive the display panel 100 in the first mode or the second mode, if necessary, and hence the fingerprint sensor can be optimally operated.

Although a case where the display panel 100 and the driver 200 are separated from each other is illustrated in FIG. 1, embodiments according to the present disclosure are not limited thereto. According to some embodiments, the whole or a portion of the driver 200 may be integrally implemented with the display panel 100. Also, although a case where the panel driver 210 and the sensor driver 220 are separate components is illustrated in FIG. 1, embodiments according to the present disclosure are not limited thereto. According to some embodiments, the panel driver 210 and the sensor driver 220 may be implemented in one structure.

Referring to FIG. 3, the display device 1000 according to some embodiments of the present disclosure may include a base layer BSL, a circuit element layer PCL, a display element layer DPL, a sensing panel TSP, and a window WD. The base layer BSL, the circuit element layer PCL, and the display element layer DPL may constitute the display panel 100.

The base layer BSL may include a transparent insulating material, thereby enabling light to be transmitted therethrough. The base layer BSL may be a rigid substrate including glass, quartz, tempered glass, or the like, or a flexible substrate made of plastic. The material of the base layer BSL is not limited thereto, and be configured with various materials.

The circuit element layer PCL and the display element layer DPL are located on the base layer BSL. According to some embodiments, the circuit element layer PCL may be located on the base layer BSL, and the display element layer DPL may be located on the circuit element layer PCL. The circuit element layer PCL may include a pixel circuit configured with a driving signal line, a transistor, a capacitor, and the like, which are used to drive the display element layer DPL. The display element layer DPL may include a light emitting element. The light emitting element of the display element layer DPL may be electrically connected to a circuit element of the circuit element layer PCL, to be driven according to voltage application of the circuit element.

The sensing panel TSP is located on one surface of the display panel 100 to overlap with the display panel 100. The sensing panel TSP may sense a contact or an input, which is caused by an external medium such as a hand (or finger) of a user or a pen, with respect to a surface of the display device. According to some embodiments, the sensing panel TSP and the display panel 100 are illustrated as separate layers. However, according to some embodiments, the sensing panel TSP may be located at a front surface of the display panel 100, to be configured as a portion of the display panel 100.

According to some embodiments, when the fingerprint sensor is implemented as a photo sensor, the sensing pixel of the fingerprint sensor may be included in the circuit element layer PCL and/or the sensing panel TSP. Accordingly, when the light emitting element of the display element layer DPL emits light, a light receiving element of the sensing pixel may receive such a signal. According to some embodiments, the fingerprint sensor may be located on the bottom of the base layer BSL.

The window WD is on the sensing panel TSP. The window WD is a protective member for protecting the display device from external impact or the like, and may be a transparent transmissive substrate. The window WD may include a glass substrate, a base film including a synthetic resin film, and the like, a light blocking pattern, a functional coating layer, and the like. The base film may be configured with a single layer or a plurality of layers. According to some embodiments, an adhesive layer may be located between the sensing panel TSP and the window WD. The adhesive layer may include an optically clear adhesive member.

According to some embodiments, a color filter layer and an overcoat layer may be located between the window WD and the sensing panel TSP.

Hereinafter, fingerprint sensing according to some embodiments of the present disclosure will be described with reference to FIG. 4.

Figure 4:
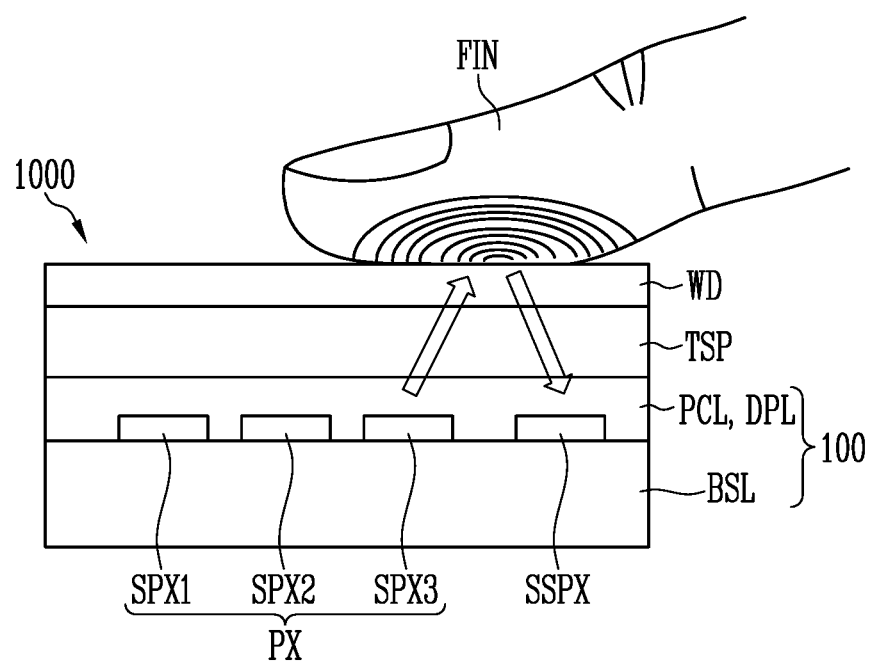
FIG. 4 is a view illustrating fingerprint sensing in a display device according to some embodiments of the present disclosure.

FIG. 4 is a view illustrating fingerprint sensing in a display device according to some embodiments of the present disclosure. The display device shown in FIG. 4 has portions similar to those shown in FIG. 3. Therefore, hereinafter, portions different from those shown in FIG. 3 will be mainly described.

Referring to FIG. 4, the display device 1000 according to some embodiments of the present disclosure may include a first sub-pixel SPX1, a second sub-pixel SPX2, a third sub-pixel SPX3, and a sensing pixel SSPX, which are located on the base layer BSL. The first sub-pixel SPX1, the second sub-pixel SPX2, and the third sub-pixel SPX3 may constitute one pixel PX (see FIG. 1).

Each of the first sub-pixel SPX1, the second sub-pixel SPX2, and the third sub-pixel SPX3 may include a light emitting element. For example, the light emitting element may be configured as an organic light emitting diode or an inorganic light emitting diode such as a micro light emitting diode or a quantum dot light emitting diode. Also, the light emitting element may be a light emitting element configured with a combination of an organic material and an inorganic material.

When a finger FIN of a user comes close to (or in contact with) the window WD, light emitted from at least one light emitting element included in the first sub-pixel SPX1, the second sub-pixel SPX2, and the third sub-pixel SPX3 may be reflected by the finger FIN of the user, and the sensing pixel SSPX may sense the reflected light, thereby outputting a corresponding electrical signal (e.g., a voltage signal). An electrical signal of each sensing pixel SSPX may constitute one spot (i.e., a spot of light and shade, which is a minimum unit constituting a fingerprint image, or a pixel) within the fingerprint image.

Reflected lights incident onto the respective sensing pixels SSPX may have different optical characteristics (e.g., different frequencies, different wavelengths, different magnitudes, or the like) according to whether or not the reflected lights are caused by valleys or ridges in a fingerprint (palm pattern, or skin pattern) of a finger (palm or skin) of the user. Therefore, the sensing pixels SSPX may output a sensing signal having different electrical characteristics, corresponding to the optical characteristics of the reflected lights.

Hereinafter, a sensing panel according to some embodiments of the present disclosure will be described with reference to FIG. 5.

Figure 5:
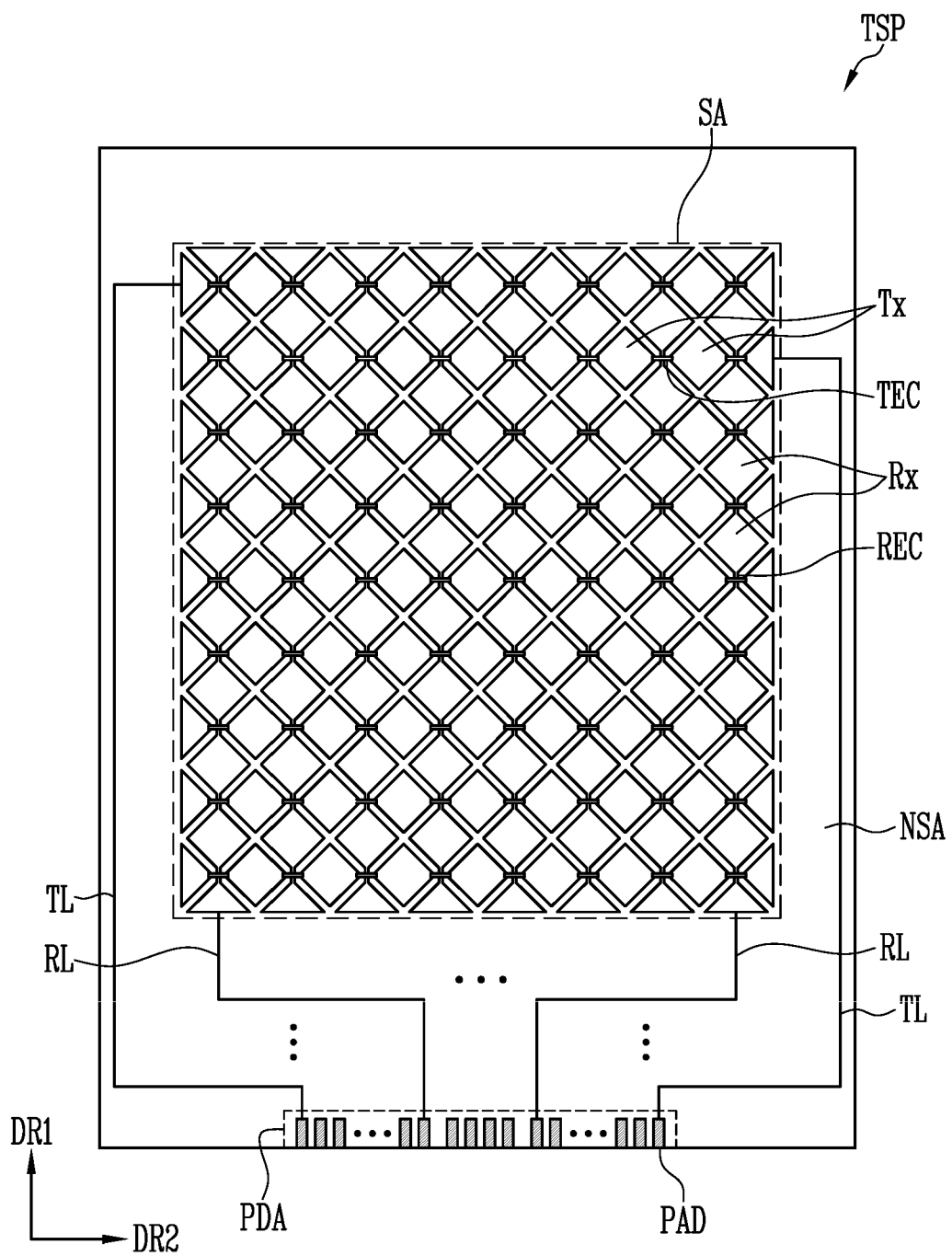
FIG. 5 is a plan view schematically illustrating a sensing panel according to some embodiments of the present disclosure.

FIG. 5 is a plan view schematically illustrating a sensing panel according to some embodiments of the present disclosure.

Referring to FIG. 5, the sensing panel TSP may include sensing electrodes Tx and Rx, and include a sensing area SA in which the sensing electrodes Tx and Rx are located and a non-sensing area NSA surrounding the sensing area SA. The sensing electrodes Tx and Rx may be located in the sensing area SA. The sensing area SA shown in FIG. 5 may be an area which includes the display area DA shown in FIGS. 1 and 2 or may further include a portion of the non-display area NDA shown in FIGS. 1 and 2, and the non-sensing area NSA may be an area which excludes the sensing area SA from the non-display area NDA shown in FIGS. 1 and 2.

The sensing electrodes Tx and Rx may include a plurality of first sensing electrodes Tx and a plurality of second sensing electrodes Rx. The first sensing electrode Tx and the second sensing electrode Rx may be separated from each other. According to some embodiments, the first sensing electrode Tx may be a sensing input electrode, and the second sensing electrode Rx may be a sensing output electrode. In addition, the first sensing electrode Tx may be a sensing output electrode, and the second sensing electrode Rx may be a sensing input electrode.

The plurality of first sensing electrodes Tx and the plurality of second sensing electrodes Rx may be alternately distributed and located in a mesh form not to overlap with each other in the sensing area. A plurality of first sensing electrodes Tx may be arranged along each of a column direction (e.g., a first direction DR1) and a row direction (e.g., a second direction DR2), and a plurality of second sensing electrodes Rx may be arranged along each of the column direction (e.g., the first direction DR1) and the row direction (e.g., the second direction DR2).

The plurality of first sensing electrodes Tx and the plurality of second sensing electrodes Rx may be located in the same layer in the sensing area SA. Alternatively, the plurality of first sensing electrodes Tx and the plurality of second sensing electrodes Rx may be located in different layers with an insulating layer interposed therebetween. The first sensing electrode Tx and the second sensing electrode Rx may have a rhombic shape. However, embodiments according to the present disclosure are not limited thereto, and the first sensing electrode Tx and the second sensing electrode Rx may have a polygonal shape such as a rectangular shape or a hexagonal shape, a circular shape, or an elliptical shape. The first sensing electrode Tx and the second sensing electrode Rx may be implemented in various shapes such as a protrusion part for improving the sensitivity of the sensing electrode.

At least some of a plurality of first sensing electrodes Tx arranged on the same row or the same column may be connected to or separated from each other or at the inside or the outside of the sensing area SA. In addition, at least some of a plurality of second sensing electrodes Rx arranged on the same row or the same column may be connected to or separated from each other or at the inside or the outside of the sensing area SA. For example, a plurality of first sensing electrodes Tx located on the same row may be connected to each other inside the sensing area SA through a first sensing electrode connection part TEC, and a plurality of second sensing electrodes Rx located on the same row may be connected to each other inside the sensing area SA through a second sensing electrode connection part REC.

A plurality of first signal lines TL and a plurality of second signal lines RL, which are respectively connected to the plurality of first sensing electrodes Tx and the plurality of second sensing electrodes Rx, may be located in the non-sensing area NSA. Also, the plurality of first signal lines TL and the plurality of second signal line RL may be connected to pads PAD of a pad area PDA.

The sensing electrodes Tx and Rx may be driven in the self-capacitance manner or the mutual capacitance manner according to a driving signal of the sensor driver 220 (see FIG. 1).

According to some embodiments, the sensing electrodes Tx and Rx may be driven in the first mode when the fingerprint sensor is not operated. The sensing electrodes Tx and Rx may be driven in the second mode when the fingerprint sensor is operated.

Hereinafter, a sectional view of a display device and structures of a pixel and a sensing pixel according to some embodiments of the present disclosure will be described with reference to FIGS. 6 to 8.

Figure 6:
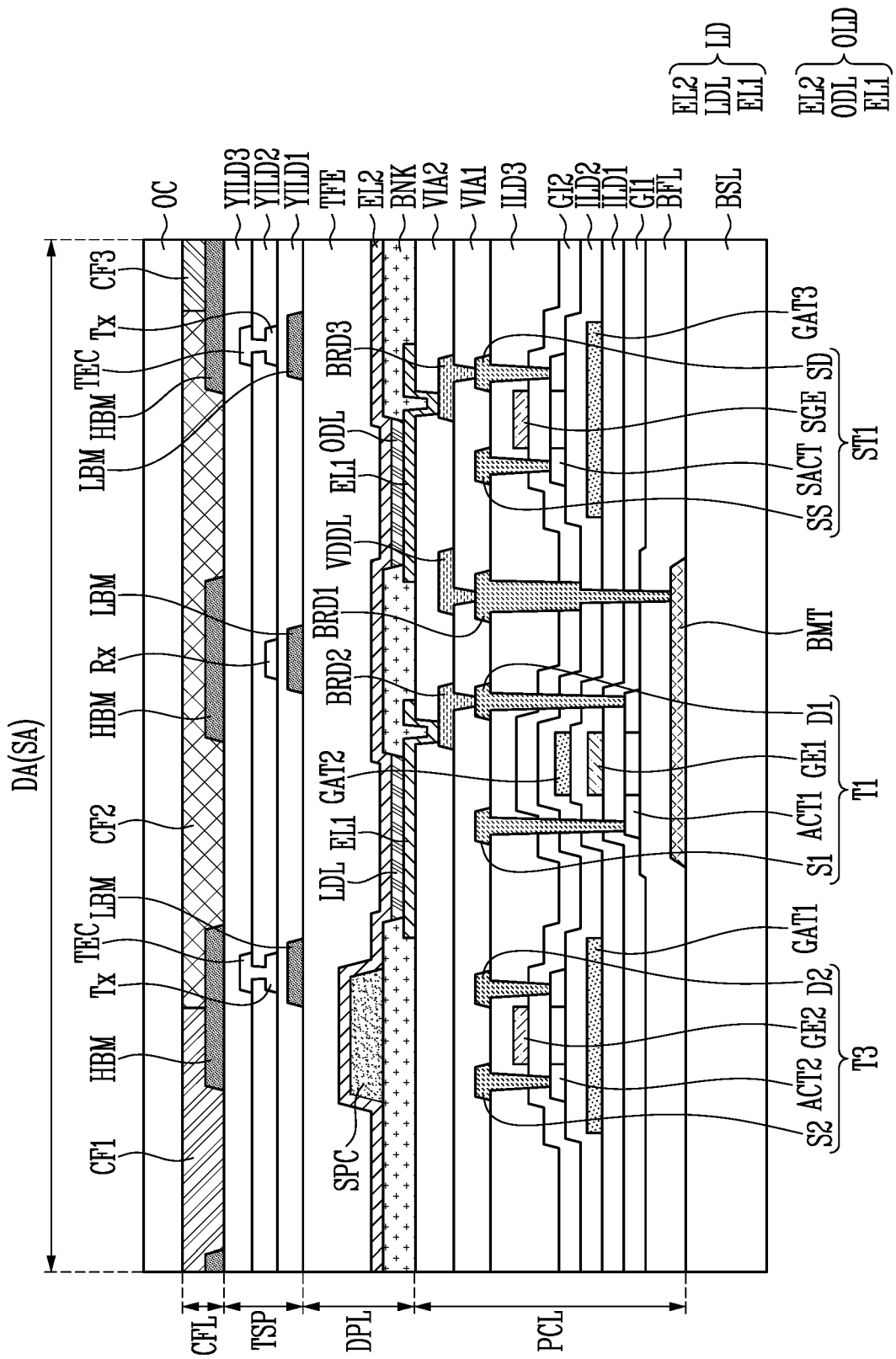
FIG. 6 is a sectional view of a display device according to some embodiments of the present disclosure.

FIG. 6 is a sectional view of a display device according to some embodiments of the present disclosure. FIG. 7 is a circuit diagram of a sub-pixel included in a display device according to some embodiments of the present disclosure. FIG. 8 is a circuit diagram of a sensing pixel included in a display device according to some embodiments of the present disclosure.

Referring to FIG. 6, the display device according to some embodiments of the present disclosure may include a base layer BSL, and a circuit element layer PCL and a display element layer DPL, which are located on the base layer BSL. The sectional view shown in FIG. 6 may correspond to the display area DA including the sensing area SA shown in FIGS. 1 and 2.

The circuit element layer PCL may include at least one transistor, at least one storage capacitor, and a plurality of lines connected thereto. Also, the circuit element layer PCL may include a buffer layer BFL, gate insulating layers GI1 and GI2, interlayer insulating layers ILD1, ILD2, and ILD3, and via layers VIA1 and VIA2, which are sequentially stacked on one surface of the base layer BSL.

A bottom metal layer BMT is located on the base layer BSL. The bottom metal layer BMT may overlap with a driving transistor T1 which will be described later. Also, the bottom metal layer BMT may be electrically connected to a driving voltage power line VDDL through a first bridge electrode BRD1.

The buffer layer BFL located on the entire surface of the base layer BSL may include an inorganic insulating material. The buffer layer BFL may prevent an impurity from being diffused into the transistor, the capacitor, and the like.

A first semiconductor pattern ACT1 is located on the buffer layer BFL. The first semiconductor pattern ACT1 may include a channel region overlapping with a first gate electrode GE1 which will be described later, and a source region and a drain region, which are located at both sides of the channel region. The first semiconductor pattern ACT1 may be made of polygonal silicon, amorphous silicon, an oxide semiconductor, or the like.

A first gate insulating layer GI1 is located on the first semiconductor pattern ACT1. The gate insulating layer GI1 may include an inorganic material including silicon oxide ($SiO_x$), silicon nitride ($SiN_x$), silicon oxynitride ($SiO_xN_y$), and the like. However, embodiments according to the present disclosure are not limited thereto. According to some embodiments, the first gate insulating layer GI1 may be an organic insulating layer including an organic material.

The first gate electrode GE1 is located on the first gate insulating layer GI1. The first gate electrode GE1 may be located to overlap with the channel region of the first semiconductor pattern ACT1. The first gate electrode GE1 along with the first semiconductor pattern ACT1, a first source electrode S1, and a first drain electrode D1 may constitute the first driving transistor T1.

A first interlayer insulating layer ILD1 is located over the first gate electrode GE1. The first interlayer insulating layer ILD1 may include the same material as the first gate insulating layer GI1 or include at least one of the example materials of the first gate insulating layer GI1. In an example, the first interlayer insulating layer ILD1 may be an inorganic insulating layer including an inorganic material.

A first gate conductor GAT1, a second gate conductor GAT2, and a third gate conductor GAT3 are located on the first interlayer insulating layer ILD1. The first gate conductor GAT1 may overlap with a diode connection transistor T3 which will be described later, the second gate conductor GAT2 may overlap with the driving transistor T1, and the third gate conductor GAT3 may overlap with a first sensing transistor ST1 which will be described later.

A second interlayer insulating layer ILD2 is located over the first gate conductor GAT1, the second gate conductor GAT2, and the third gate conductor GAT3. The second interlayer insulating layer ILD2 may include an inorganic material including silicon oxide ($SiO_x$), silicon nitride ($SiN_x$), silicon oxynitride ($SiO_xN_y$), and the like. However, embodiments according to the present disclosure are not limited thereto. According to some embodiments, the second interlayer insulating layer ILD2 may be an organic insulating layer including an organic material.

A second semiconductor pattern ACT2 and a sensing semiconductor pattern SACT are located on the second interlayer insulating layer ILD2. The second semiconductor pattern ACT2 may include a channel region overlapping with a second gate electrode GE2 which will be described later, and a source region and a drain region, which are located at both sides of the channel region. The sensing semiconductor pattern SACT may include a channel region overlapping with a sensing gate electrode SGE, and a source region and a drain region, which are located at both sides of the channel region. The second semiconductor pattern ACT2 and the sensing semiconductor pattern SACT may be made of polygonal silicon, amorphous silicon, an oxide semiconductor, or the like.

A second gate insulating layer GI2 is located over the second semiconductor pattern ACT2 and the sensing semiconductor pattern SACT. The second gate insulating layer GI2 may include an inorganic material including silicon oxide ($SiO_x$), silicon nitride ($SiN_x$), silicon oxynitride ($SiO_xN_y$), and the like. However, embodiments according to the present disclosure are not limited thereto. According to some embodiments, the second gate insulating layer GI2 may be an organic insulating layer including an organic material.

The second gate electrode GE2 and the sensing gate electrode SGE are located on the second gate insulating layer GI2. The second gate electrode GE2 may be located to overlap with the channel region of the second semiconductor pattern ACT2. The second gate electrode GE2 along with the second semiconductor pattern ACT2, a second source electrode S2, and a second drain electrode D2 may constitute the diode connection transistor T3. The sensing gate electrode SGE may be located to overlap with the channel region of the sensing semiconductor pattern SACT. The sensing gate electrode SGE along with the sensing semiconductor pattern SACT, a sensing source electrode SS, and a sensing drain electrode SD may constitute the first sensing transistor ST1.

A third interlayer insulating layer ILD3 is located over the second gate electrode GE2 and the sensing gate electrode SGE. The third interlayer insulating layer ILD3 may be an organic insulating layer including an organic material. However, embodiments according to the present disclosure are not limited thereto. According to some embodiments, the third interlayer insulating layer ILD3 may be an inorganic insulating layer including an inorganic material.

The first source electrode S1, the first drain electrode D1, the second source electrode S2, the second drain electrode D2, the sensing source electrode SS, the sensing drain electrode SD, and the first bridge electrode BRD1 are located on the third interlayer insulating layer ILD3. The first source electrode S1 and the first drain electrode D1 may be electrically connected respectively to the source region and the drain region of the first semiconductor pattern ACT1 through contact holes formed in the third interlayer insulating layer ILD3, the second gate insulating layer GI2, the second interlayer insulating layer ILD2, the first interlayer insulating layer ILD1, and the first gate insulating layer GI1. The second source electrode S2 and the second drain electrode D2 may be electrically connected respectively to the source region and the drain region of the second semiconductor pattern ACT2 through contact holes formed in the third interlayer insulating layer ILD3 and the second gate insulating layer GI2. The sensing source electrode SS and the sensing drain electrode SD may be electrically connected respectively to the source region and the drain region of the sensing semiconductor pattern SACT through contact holes formed in third interlayer insulating layer ILD3 and the second gate insulating layer GI2. The first bridge electrode BRD1 may be electrically connected to the bottom metal layer BMT through a contact hole formed in the third interlayer insulating layer ILD3, the second gate insulating layer GI2, the second interlayer insulating layer ILD2, the first interlayer insulating layer ILD1, the first gate insulating layer GI1, and the buffer layer BFL.

A first via layer VIA1 is located over the first source electrode S1, the first drain electrode D1, the second source electrode S2, the second drain electrode D2, the sensing source electrode SD, and the first bridge electrode BRD1. The first via layer VIA1 may be an organic insulating layer including an organic material. However, embodiments according to the present disclosure are not limited thereto. According to some embodiments, the first via layer VIA1 may be an inorganic insulating layer including an inorganic material.

A second bridge electrode BRD2, the driving voltage power line VDDL, and a third bridge electrode BRD3 are located on the first via layer VIA1. The second bridge electrode BRD2 may be electrically connected to the first drain electrode D1 through a contact hole formed in the first via layer VIA1. The driving voltage power line VDDL may be electrically connected to the first bridge electrode BRD1 through a contact hole formed in the first via layer VIA1. Accordingly, a driving voltage (e.g., VDD) provided from the driving voltage power line VDDL may be applied to the bottom metal layer BMT. The third bridge electrode BRD3 may be electrically connected to the sensing drain electrode SD through a contact hole formed in the first via layer VIA1.

A second via layer VIA2 is located over the second bridge electrode BRD, the driving voltage power line VDDL, and the third bridge electrode BRD3. The second via layer VIA2 may be an organic insulating layer including an organic material. However, embodiments according to the present disclosure are not limited thereto. According to some embodiments, the second via layer VIA2 may be an inorganic insulating layer including an inorganic material.

Pixel electrodes EL1 are located on the second via layer VIA2. One pixel electrode EL1 among the pixel electrodes EL1 may be electrically connected to the second bridge electrode BRD2 through an opening formed in the second via layer VIA2. In addition, one pixel electrode EL1 among the pixel electrodes EU may be electrically connected to the third bridge electrode BR3 through an opening formed in the second via layer VIA2.

Bank patterns BNK are located on the second via layer VIA2 and a portion of the pixel electrode EL1. The bank patterns BNK may be located while being spaced apart from each other such that a top surface of the pixel electrode EL1 is exposed. The bank patterns BNK may include an organic material such as polyacrylate resin or polyimide resin, or a silica-based inorganic material.

A spacer SPC may be located on at least one bank pattern BNK among the bank patterns BNK. The spacer SPC may include an organic material.

A light emitting layer LDL and a light receiving layer ODL are located in openings (or top surfaces of the pixel electrodes EL1) between the bank patterns BNK. The light emitting layer LDL is an organic light emitting layer, and may be made of a low-molecular organic material or a high-molecular organic material such as Poly 3,4-ethylene-dioxythiophene (PEDOT). Also, the light emitting layer LDL may be formed as a multi-layer including at least one of an organic material layer, a hole injection layer, a hole transporting layer, an electron transporting layer, or an electron injection layer. The light emitting layer LDL may include a red light emitting layer emitting light of red, a green light emitting layer emitting light of green, and a blue light emitting layer emitting light of blue, and the red light emitting layer, the green light emitting layer, and the blue light emitting layer may be respectively located in a red sub-pixel, a green sub-pixel, and a blue sub-pixel, to implement a color image. The light receiving layer ODL may be made of an organic photosensitive material. For example, the organic photosensitive material may include dithiolene-base material (BON) (bis(4-dimethylaminodithiobenzil) nickel(II)), a benzotriazole-based polymer compound (PTZBTTT-BDT), porphyrin-based small molecule material (DHTBTEZP), and the like, but embodiments according to the present disclosure are not limited thereto.

A common electrode EL2 is located over the spacer SPC, the bank patterns BNK, the light emitting layer LDL, and the light receiving layer ODL. The common electrode EL2 may be located to entirely cover top surfaces of the spacer SPC, the bank patterns BNK, and the light emitting layer LDL. The common electrode EL2 along with the light emitting layer LDL, the light receiving layer ODL, and the pixel electrode EU may constitute a light emitting element LD. Also, the common electrode EL2 along with the light receiving layer ODL and the pixel electrode EL1 may constitute a light emitting element OLD.

An encapsulation layer TFE is located on the common electrode EL2. The encapsulation layer TFE may be arranged to seal the light emitting element LD. The encapsulation layer TFE may include at least one organic layer and at least one inorganic layer. The encapsulation layer TFE may become a base layer of a sensing panel TSP.

Lower light blocking patterns LBM are located on the encapsulation layer TFE. The lower light blocking pattern LBM may include at least one black matrix material (e.g., at least one light blocking material known in the art) among various kinds of black matrix materials, a color filter material of a specific color, and the like.

A first sensing insulating layer YILD1 is located over the lower light blocking pattern LBM.

A first sensing electrode Tx and a second sensing electrode Rx are located on the first sensing insulating layer YILD1. The first sensing electrode Tx and the second sensing electrode Rx may include a transparent conductive electrode such as indium tin oxide (ITO), indium zinc oxide (IZO), zinc oxide ($ZnO_x$), or indium tin zinc oxide (ITZO).

A second sensing insulating layer YILD2 is located over the first sensing electrode Tx and the second sensing electrode Rx. The second sensing insulating layer YILD2 may include an inorganic material including silicon oxide ($SiO_x$), silicon nitride ($SiN_x$), silicon oxynitride ($SiO_xN_y$), and the like. However, embodiments according to the present disclosure are not limited thereto. According to some embodiments, the second sensing insulating layer YILD2 may be an organic insulating layer including an organic material.

A first sensing electrode connection part TEC is located on the second sensing insulating layer YILD2. The first sensing electrode connection part TEC may be electrically connected to the first sensing electrode Tx through a contact hole formed in the second sensing insulating layer YILD2.

A third sensing insulating layer YILD3 is located over the first sensing electrode connection part TEC. The third sensing insulating layer YILD3 may include an organic material. However, embodiments according to the present disclosure are not limited thereto. According to some embodiments, the third sensing insulating layer YILD3 may be an inorganic insulating layer including an inorganic material.

A color filter layer CFL is located on the third sensing insulating layer YILD3. The color filter layer CFL may include a first color filter CF1, a second color filter CF2, a third color filter CF3, and upper light blocking patterns HBM.

The first color filter CF1 may include a color filter material for allowing light of a first color, which is generated in one sub-pixel, to be selectively transmitted therethrough. For example, when the one sub-pixel is a blue pixel, the first color filter CF1 may include a blue color filter material.

The second color filter CF2 may include a color filter material for allowing light of a second color, which is generated in one sub-pixel, to be selectively transmitted therethrough. For example, when the one sub-pixel is a green pixel, the second color filter CF2 may include a green color filter material.

The third color filter CF3 may include a color filter material for allowing light of a third color, which is generated in one sub-pixel, to be selectively transmitted therethrough. For example, when the one sub-pixel is a red pixel, the third color filter CF3 may include a red color filter material.

The upper light blocking patterns HBM may be respectively located between two adjacent color filters among the first to third color filters CF1, CF2, and CF3. For example, an upper light blocking pattern HBM may be located between the first color filter CF1 and the second color filter CF2, an upper light blocking pattern HBM may be located between the second color filter CF2 and the third color filter CF3, and an upper light blocking pattern HBM may be located between the third color filter CF3 and the first color filter CF1. The upper light blocking pattern HBM may include at least one black matrix material (e.g., at least one light blocking material known in the art) among various kinds of black matrix materials, a color filter material of a specific color, and the like. The upper light blocking pattern HBM may include the same material as the lower light blocking pattern LBM, but embodiments according to the present disclosure are not limited thereto. According to some embodiments, the upper light blocking pattern HBM may include a material different from the material of the lower light blocking pattern LBM.

An overcoat layer OC is located on the color filter layer CFL. The overcoat layer OC may serve as an encapsulation layer for preventing oxygen, moisture, and the like from infiltrating into the light emitting element LD. Also, the overcoat layer OC may planarize an upper surface of a display panel.

Figure 7:
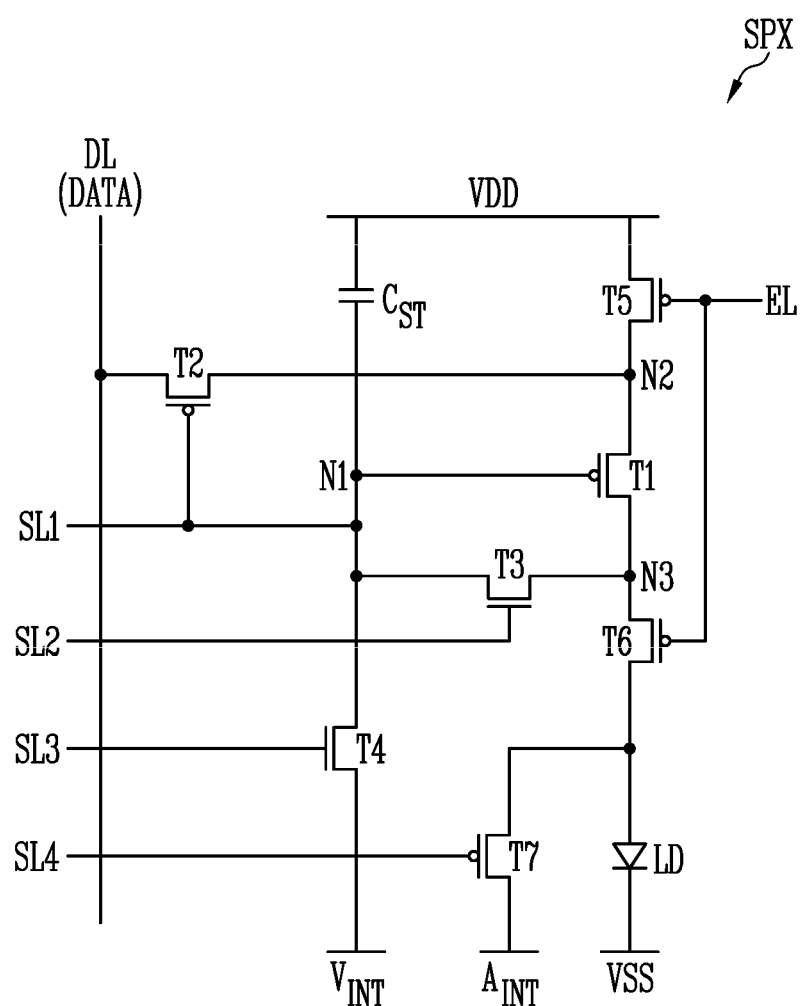
FIG. 7 is a circuit diagram of a sub-pixel included in a display device according to some embodiments of the present disclosure.

Referring to FIG. 7, the sub-pixel SPX according to some embodiments of the present disclosure includes transistors T1, T2, T3, T4, T5, T6, and T7, a storage capacitor CST, and a light emitting element LD.

A gate electrode of a first transistor T1 (or driving transistor) may be connected to a first node N1, a first electrode of the first transistor T1 may be connected to a second node N2, and a second electrode of the first transistor T1 may be connected to a third node N3.

A gate electrode of a second transistor T2 (or scan transistor) may be connected to a first scan line SL1, a first electrode of the second transistor T2 may be connected to a data line DL, and a second electrode of the second transistor T2 may be connected to the second node N2.

A gate electrode of a third transistor T3 (or diode connection transistor) may be connected to a second scan line SL2, a first electrode of the third transistor T3 may be connected to the first node N1, and a second electrode of the third transistor T3 may be connected to the third node N3.

A gate electrode of a fourth transistor T4 (or gate initialization transistor) may be connected to a third scan line SL3, a first electrode of the fourth transistor T4 may be connected to the first node N1, and a second electrode of the fourth transistor T4 may be connected to a first initialization power source $V_{INT}$.

A gate electrode of a fifth transistor T5 (or emission transistor) may be connected to an emission line EL, a first electrode of the fifth transistor T5 may be connected to a first driving power source VDD, and a second electrode of the fifth transistor T5 may be connected to the second node N2. According to some embodiments, the gate electrode of the fifth transistor T5 may be connected to an emission line different from an emission line connected to a gate electrode of a sixth transistor T6.

The gate electrode of the sixth transistor T6 (or emission transistor) may be connected to the emission line EL, a first electrode of the sixth transistor T6 may be connected to the third node N3, and a second electrode of the sixth transistor T6 may be connected to an anode (or a pixel electrode) of the light emitting element LD.

A gate electrode of a seventh transistor T7 (or light emitting element initialization transistor) may be connected to a fourth scan line SL4, a first electrode of the seventh transistor T7 may be connected to a second initialization power source $A_{INT}$, and a second electrode of the seventh transistor T7 may be connected to the anode of the light emitting element LD.

A first electrode of the storage capacitor CST may be connected to the first driving power source VDD, and a second electrode of the storage capacitor CST may be connected to the first node N1.

The anode of the light emitting element LD may be connected to the second electrode of the sixth transistor T6, and a cathode (or a common electrode) of the light emitting element LD may be connected to a second driving power source VSS. The light emitting element LD may be a light emitting diode. The light emitting element LD may be configured as an organic light emitting diode, an inorganic light emitting diode, a quantum dot/well light emitting diode, or the like. The light emitting element LD may emit light of any one color among the first color, the second color, and the third color. According to some embodiments, only one light emitting element LD is provided in each pixel. However, according to some embodiments, a plurality of light emitting elements may be provided in each pixel. The plurality of light emitting elements may be connected in series, parallel, series/parallel, or the like.

In an example, a voltage of the first driving power source VDD may be higher than a voltage of the second driving power source VSS. For example, a voltage of the first initialization power source $V_{INT}$ and/or a voltage of the second initialization power source $A_{INT}$ may be may equal to or higher than the voltage of the second driving power source VSS. For example, the voltage of the first initialization power source $V_{INT}$ and/or the voltage of the second initialization power source $A_{INT}$ may correspond to a data voltage having the smallest magnitude among data voltages to be provided. In another example, a magnitude(s) of the voltage of the first initialization power source $V_{INT}$ and/or the voltage of the second initialization power source $A_{INT}$ may be lower than magnitudes of the data voltages to be provided.

In an example, when a scan signal having a turn-off level is applied to the first scan line SL1 and the second scan line SL2, the second transistor T2 may be in a turn-off state, and a data voltage of a previous pixel can be prevented from being input to a pixel PX.

When the second transistor T2 is in the turn-off state, the first node N1 may be connected to the first initialization power source $V_{INT}$ when a scan signal having a turn-on level is applied. Therefore, a voltage of the first node N1 may be initialized.

When the second transistor T2 is in the turn-off state, the fifth transistor T5 and the sixth transistor T6 may be in the turn-off state when an emission signal having a turn-off level (or logic high level) is applied to the emission line EL. Thus, unnecessary light emission of the light emitting element LD according to an initialization voltage application process can be prevented.

When the scan signal having the turn-on level is applied to the first scan line SL1 and the second scan line SL2 after a time (e.g., a set or predetermined time) elapses, the second transistor T2 and the third transistor T3 may be turned on, so that the data line DL and the first node are electrically connected to each other. Therefore, a compensation voltage obtained by subtracting a threshold voltage of the first transistor T1 from a data voltage DATA may be applied to the second electrode of the storage capacitor CST (i.e., the first node N1), and the storage capacitor CST may maintain a voltage corresponding to a difference between the voltage of the first driving power source VDD and the compensation voltage. Such a period may be referred to as a threshold voltage compensation period or a data writing period.

When the scan signal having the turn-on level is applied to the fourth scan line SL4, the seventh transistor T7 may be turned on, so that the anode of the light emitting element LD and the second initialization power source $A_{INT}$ are connected to each other. The light emitting element LD may be initialized to a charge amount corresponding to a difference between the voltage of the second initialization power source $A_{INT}$ and the voltage of the second driving power source VSS.

Subsequently, as an emission signal having a turn-on level is applied to the emission line EL, the fifth and sixth transistors T5 and T6 may be turned on. Therefore, a driving current path may be formed, through which the first driving power source VDD, the fifth transistor T5, the first transistor T1, the sixth transistor T6, the light emitting element LD, and the second driving power source VSS are connected to each other.

An amount of driving current flowing in the first electrode and the second electrode of the first transistor T1 may be adjusted according to the voltage maintained by the storage capacitor CST. The light emitting element LD may emit light with a luminance corresponding to the amount of driving current. The light emitting element LD may emit light until before the emission signal having the turn-off level is applied to the emission line EL.

Although an example in which the transistors are implemented as N-type and P-type transistors is illustrated in FIG. 7, embodiments according to the present disclosure are not limited thereto, and the circuit structure of the pixel PX may be variously modified.

Figure 8:
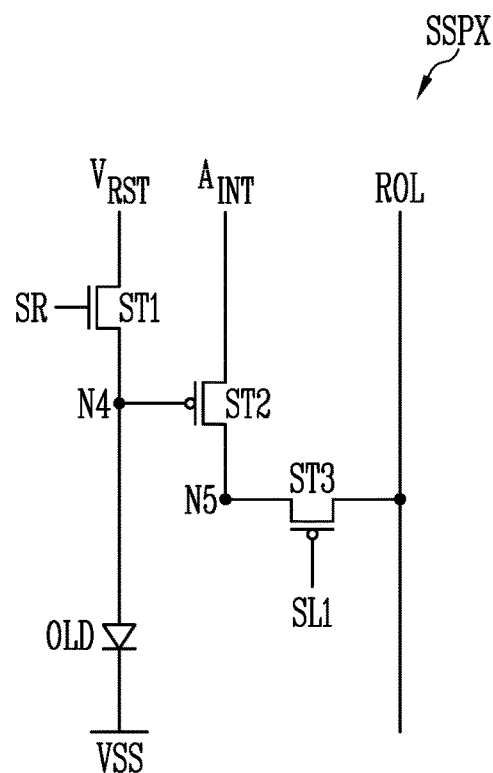
FIG. 8 is a circuit diagram of a sensing pixel included in a display device according to some embodiments of the present disclosure.

Referring to FIG. 8, the sensing pixel SSPX according to some embodiments of the present disclosure may include sensing transistors ST1, ST2, and ST3 and a light receiving element OLD. The light receiving element OLD is a photo diode, and may correspond to an example of an optical element.

A first sensing transistor ST1 may include a gate electrode connected to a horizontal scan line SR, a first electrode connected to a reset power source VRST, and a second electrode connected to a fourth node N4.

A second sensing transistor ST2 may include a gate electrode connected to the fourth node N4, a first electrode connected to the second initialization power source $A_{INT}$, and a second electrode connected to a fifth node N5.

A third sensing transistor ST3 may include a gate electrode connected to the first scan line SL1, a first electrode connected to the fifth node N5, and a second electrode connected to a read line ROL.

An anode of the light receiving element OLD may be connected to the second driving power source VSS, and a cathode of the light emitting element LOD may be connected to the fourth node N4 (i.e., the second electrode of the first sensing transistor ST1). The light receiving element OLD may generate carriers including free electrons and holes, based on the intensity of light incident onto the light receiving element OLD, and generate a current (optical current) caused by movement of the carriers.

In an example, when the scan signal having the turn-on level is applied to the horizontal scan line SR, the first sensing transistor ST1 may be turned on, and a voltage of the reset power source VRST may be applied to the fourth node N4. In addition, the anode of the light receiving element OLD may be reset by the voltage of the reset power source VRST.

When the voltage of the reset power source VRST is lower than a threshold voltage of the second sensing transistor ST2, the second sensing transistor ST2 may be turned on, so that the voltage of the second initialization power source $A_{INT}$ is applied to the fifth node N5. Subsequently, as the scan signal having the turn-on level is applied to the first scan line SL1, the third sensing transistor ST3 may allow a voltage of the fifth node N5 to be output through the read line ROL.

According to some embodiments, the sub-pixel SPX shown in FIG. 7 and the sensing pixel SSPX shown in FIG. 8 may share at least one scan line. For example, the horizontal scan line SR connected to the gate electrode of the first sensing transistor ST1 and the third scan line SL3 connected to the gate electrode of the fourth transistor described with reference to FIG. 7 may be the same scan line. That is, the scan signal supplied to the gate electrode of the fourth transistor T4 included in the sub-pixel SPX shown in FIG. 7 and the scan signal supplied to the gate electrode of the first sensing transistor ST1 included in the sensing pixel SSPX shown in FIG. 8 may be the same signal. The fourth transistor T4 and the first sensing transistor ST1 may be simultaneously turned on or turned off. Accordingly, a timing (or period) at which the gate electrode of the first transistor T1 (or the first node N1) is initialized by the voltage of the first initialization power source $V_{INT}$ as the fourth transistor T4 is turned on and a timing (or period) at which the anode of the light receiving element OLD is reset by the voltage of the reset power source VRST as the first sensing transistor ST1 is turned on may be the same.

Meanwhile, when the fingerprint sensor is operated, the operating time of the fingerprint sensor may not be sufficiently secured when the panel driver 210 (see FIG. 1) drives the display panel 100 (see FIG. 1) at a relatively high frame frequency (e.g., 120 Hz or the like). For example, when the third scan line SL3 connected to the sub-pixel SPX shown in FIG. 7 and the horizontal scan line SR connected to the sensing pixel SSPX shown in FIG. 8 are the same scan line as described above, the anode of the light receiving element OLD of the sensing pixel SSPX may be reset to a cycle corresponding to the frame frequency at which the display panel 100 (see FIG. 1) is driven (i.e., the anode of the light receiving element OLD is reset to a relatively short cycle, corresponding to a relatively high frame frequency). Any sufficient time for sensing reflected light and outputting an electrical signal (e.g., a voltage signal) corresponding to the reflected light may not be secured. Accordingly, as described with reference to FIGS. 1 to 3, the panel driver 210 according to some embodiments of the present disclosure may drive the display panel 100 (or a partial area of the display panel 100) at a fixed frequency (e.g., 60 Hz or the like) to sufficiently secure an operating time of the fingerprint sensor, when the fingerprint sensor is operated.

Meanwhile, although an example in which the transistors are implemented as N-type and P-type transistors is illustrated in FIG. 8, embodiments according to the present disclosure are not limited thereto, and the circuit structure of the sensing pixel SSPX may be variously modified.

Figure 9:
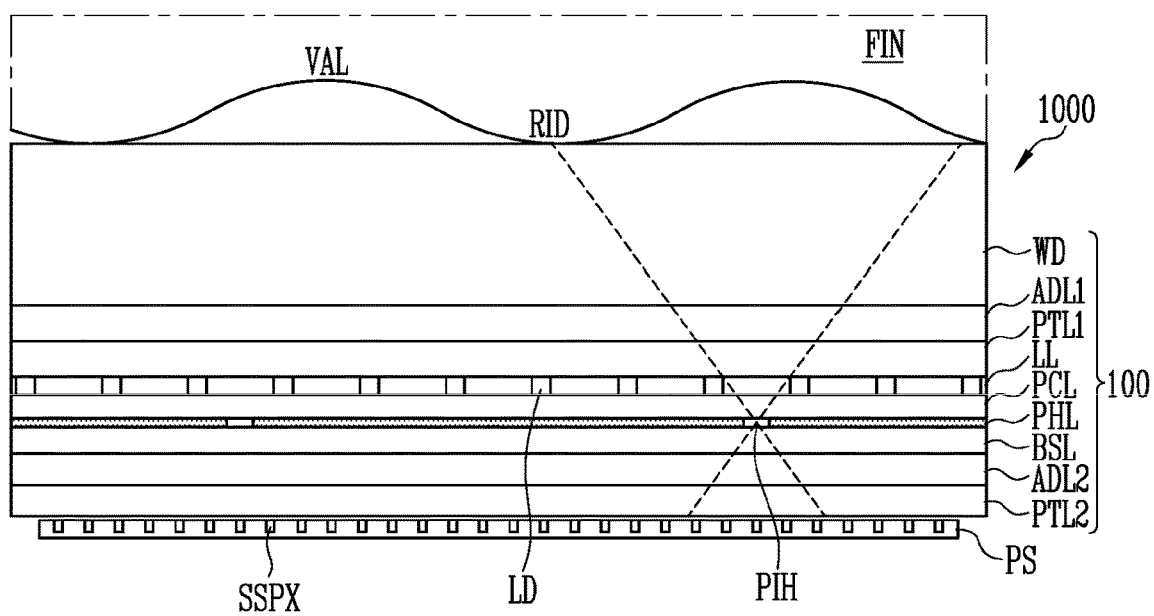
FIG. 9 is a sectional view illustrating an example of a display device according to some embodiments of the present disclosure.

FIG. 9 is a sectional view illustrating an example of a display device according to some embodiments of the present disclosure.

Referring to FIG. 9, the display device 1000 according to some embodiments of the present disclosure may include a display panel 100 and a photo sensor PS located on one surface of the display panel 100. The photo sensor PS may be arranged corresponding to the sensing area SA described with reference to FIG. 1. The display device 1000 (or the display panel 100) may include a base layer BSL, and a circuit element layer PCL, a light emitting element layer LL, a first protective layer PTL1, a first adhesive layer ADL1, and a window WD, which are sequentially arranged on one surface (e.g., an upper surface) of the base layer BSL. Also, the display device 1000 may include a second adhesive layer ADL2 and a second protective layer PTL2, which are sequentially arranged on another surface (e.g., a lower surface) of the base layer BSL. The base layer BSL, the circuit element layer PCL, and the window WD are the same as described with reference to FIGS. 3 and 4. Therefore, hereinafter, overlapping descriptions will be omitted.

The light emitting element layer LL may be located on one surface of the circuit element layer PCL. The light emitting element layer LL may include a plurality of light emitting elements LD connected to circuit elements and/or lines of the circuit element layer PCL through contact holes or the like. The light emitting element layers LL may correspond to a partial structure of the display element layer DPL described with reference to FIG. 6.

A light blocking layer PHL may include pin holes PIH, and be located inside the display panel 100 or between the display panel 100 and sensing pixels SSPX, to block some of lights incident onto the sensing pixels SSPX. For example, some of lights incident onto the light blocking layer PHL may be blocked, and the others may reach the sensing pixels SSPX under the light blocking layer PHL while passing through the pin holes PIH. The pin holes PIH may serve as an optical system, and be used together with another optical system.

Only reflected lights passing through the pin holes PIH may reach the sensing pixels SSPX of the photo sensor PS. A phase of light reflected from a fingerprint and a phase of an image formed on the photo sensor PS may have a difference of 180 degrees due to the pin hole having a very narrow width.

The first protective layer PTL1 may be located on the top of the light emitting element layer LL. The first protective layer PTL1 may include a sealing member such as a thin film encapsulation (TFE) or an encapsulation substrate, and additionally include a protective film and the like in addition to the sealing member. The first protective layer PTL1 may correspond to a partial structure of the display element layer DPL described with reference to FIG. 6.

The first adhesive layer ADL1 may be located between the first protective layer PTL1 and the window WD to couple the first protective layer PTL1 and the window WD to each other. The first adhesive layer ADL1 may include a transparent adhesive such as an optically clear adhesive (OCA), and include various adhesive materials in addition to the transparent adhesive.

According to some embodiments, the display device 1000 may further include a polarizing plate, an anti-reflective layer, and/or a sensing panel. For example, the display device 1000 may further include the polarizing plate and/or the sensing panel TSP (see FIGS. 3 and 4), located between the first protective layer PTL1 and the window WD.

The second protective layer PTL2 may be coupled to a bottom surface of the base layer BSL by the second adhesive layer ADL2. The second protective layer PTL2 may block oxygen, moisture, and the like from being introduced from the outside, and be provided in the form of a single layer or a multi-layer. The second protective layer PTL2 may be configured in a film shape, to further ensure flexibility of the display panel 100. The second protective layer PTL2 may be coupled to the photo sensor PS through another adhesive layer including a transparent adhesive such as an OCA.

The second adhesive layer ADL2 may firmly couple (or attach) the base layer BSL and the second protective layer PTL2 to each other. The second adhesive layer ADL2 may include a transparent adhesive such as an OCA. The second adhesive layer ADL2 may include a Pressure Sensitive Adhesive (PSA0) in which an adhesive material acts when pressure for allowing the second adhesive layer ADL2 to be adhered to an adhesive surface is applied.

The photo sensor PS may be attached to one surface (e.g., a back surface) of the display panel 100 through an adhesive or the like to overlap with at least one area of the display panel 100. For example, the photo sensor PS may be arranged to overlap with the display panel 100. The photo sensor PS may include a plurality of sensing pixels SSPX (see FIG. 8) distributed at a resolution (e.g., a set or predetermined resolution) and/or a distance (e.g., a set or predetermined distance).

The sensing pixels SSPX may sense external light and output a corresponding electrical signal, e.g., a voltage signal. Reflected lights received to the respective sensing pixels SSPX may have optical characteristics (e.g., frequencies, wavelengths, magnitudes, and the like) caused by valleys VAL and ridges (RID) of a fingerprint formed at a finger FIN of a user. Therefore, the sensing pixels SSPX may output sensing signals having different electrical characteristics corresponding to the optical characteristics of the reflected lights, respectively.

According to some embodiments, the sensing pixels SSPX may constitute an ultrasonic sensor for sensing ultrasonic waves. The sensing pixels SSPX may radiate an ultrasonic signal, and output corresponding electrical signals by sensing ultrasonic waves reflected by the finger FIN of the user.

According to some embodiments, the sensing pixels SSPX may constitute a capacitance sensor in which capacitance is changed according to the shape of a fingerprint.

In various embodiments, the sensing pixels SSPX may be located on the other surface (e.g., a back surface) facing a surface (e.g., a front surface) on which an image is displayed among both surfaces of the display panel 100. However, embodiments according to the present disclosure are not limited thereto. According to some embodiments, the arrangement of the sensing pixels SSPX may be changed.

Hereinafter, a driving method of the display device according to some embodiments of the present disclosure will be described with reference to FIG. 10.

FIG. 10 is a flowchart illustrating an example of a driving method of the display device according to some embodiments of the present disclosure. Hereinafter, FIG. 10 is described in conjunction with FIGS. 1 to 9, and therefore, the reference numerals indicated in FIGS. 1 to 9 are added.

Referring to FIG. 10, in the display device 1000 according to some embodiments of the present disclosure, the panel driver 210 and the sensor driver 220 may drive the display panel 100, the sensing panel TSP, the sensing pixel SSPX, and the like in different modes according to whether or not the fingerprint sensor is operated (S1010). When the fingerprint sensor is not operated (N), the panel driver 210 may drive the display panel 100 in the first mode, and the sensor driver 220 may drive the sensing panel TSP, the sensing pixel SSPX, and the like in the first mode (S1050).

When the fingerprint sensor is operated (Y), the panel driver 210 may drive the display panel 100 at the fixed frequency. That is, the panel driver 210 may drive the display panel 100 in the second mode (S1020).

Also, when the fingerprint sensor is operated (Y), the sensor driver 220 may drive the sensing panel TSP in the mutual capacitance manner. However, embodiments according to the present disclosure are not limited thereto. According to some embodiments, the sensor driver 220 may drive the sensing panel in the mutual capacitance manner and the self-capacitance manner by changing a sensing cycle of the self-capacitance manner. Also, the sensor driver 220 may not output, to the sensing panel TSP, an initial signal for searching whether or not a stylus pen exists. Also, the sensor driver 220 may output a driving signal corresponding to the fixed frequency to the fingerprint sensor. That is, the sensor driver 220 may drive the sensing panel TSP, the sensing pixel SSPX, and the like in the second mode (S1030).

Subsequently, the driver 200 of the display device 1000 may determine whether or not a fingerprint sensor operation has been ended (S1040).

When the fingerprint sensor operation is ended (Y), the panel driver 210 may drive the display panel 100 in the first mode, and the sensor driver 220 may drive the sensing panel TSP, the sensing pixel SSPX, and the like in the first mode (S1050).

That is, according to some embodiments, as the panel driver 210 drives the display panel 100 in the second mode when the fingerprint sensor is operated, an operating time of the fingerprint sensor can be sufficiently secured. As the sensor driver 220 drives the sensing panel TST and the fingerprint sensor in the second mode when the fingerprint sensor is operated, noise with respect to a fingerprint detection result can be reduced. Thus, the display device 1000 according to some embodiments of the present disclosure can drive the sensing panel TSP and the fingerprint sensor in the first mode or the second mode, if necessary. Accordingly, the accuracy of the fingerprint detection result can be improved.

Hereinafter, an example of a driving method of the sensor driver according to some embodiments of the present disclosure will be described with reference to FIG. 11.

FIG. 11 illustrates frequencies of mutual capacitance driving signals and self-capacitance driving signals, which sensor drivers in accordance with a comparative example and embodiments provide to the sensing panel, when the fingerprint sensor is operated.

Referring to FIG. 11, a sensor driver in accordance with a comparative example may provide the sensing panel with a mutual capacitance driving signal MCS and a self-capacitance driving signal SCS the same number of times for each cycle T.

A sensor driver in accordance with Embodiment 1 may provide the sensing panel with the self-capacitance driving signal SCS a number of times, which is smaller than a number of times the mutual capacitance driving signal MCS is provided for each cycle T.

A sensor driver in accordance with Embodiment 2 may constantly maintain a number of times the mutual capacitance driving signal MCS is provided, and provide the sensing panel with the self-capacitance driving signal SCS for each two cycles 2T.

That is, according to some embodiments, the number of times the sensor driver provides the self-capacitance driving signal SCS to the sensing panel is decreased when the fingerprint sensor is operated, so that noise with respect to a fingerprint detection result can be reduced. Accordingly, the accuracy of the fingerprint detection result can be improved.

According to some embodiments of the present disclosure, as the panel driver drives the display panel in the second mode when the fingerprint sensor is operated, an operating time of the fingerprint sensor can be sufficiently secured. As the sensor driver drives the sensing panel and the fingerprint sensor in the second mode when the fingerprint sensor is operated, noise with respect to a fingerprint detection result can be reduced.

Also, according to some embodiments of the present disclosure, the display device can drive the sensing panel and the fingerprint sensor in the first mode or the second mode, if necessary, and thus the accuracy of the fingerprint detection result can be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, and their equivalents.

What is claimed is:

1. A display device comprising:
a display panel including a sensing area having display pixels and sensing pixels, each display pixel comprising a plurality of sub-pixels, and at least one sensing pixel is located outside a periphery of a corresponding one of the display pixels;
a sensing panel overlapping with the display panel, the sensing panel including sensing electrodes;
a fingerprint sensor overlapping with the sensing panel, the fingerprint sensor having light emitting elements of the display pixels and light receiving elements of the sensing pixels;
a panel driver configured to drive the display panel; and
a sensor driver configured to drive the sensing panel and the fingerprint sensor,
wherein the panel driver and the sensor driver are configured to vary a driving mode according to an operation of the fingerprint sensor such that in response to the fingerprint sensor not being operated, the driving mode of sensor driver is configured to drive the sensing panel in a self-capacitance manner and a mutual capacitance manner, and in response to the fingerprint sensor being operated, the driving mode of the sensor driver is configured to drive the sensing panel in the mutual capacitance manner.

2. The display device of claim 1, wherein, in response to the fingerprint sensor not being operated, the panel driver is configured to drive the display panel at a variable frequency according to an image displayed on the display panel.

3. The display device of claim 1, wherein, in response to the fingerprint sensor being operated, the panel driver is configured to drive the display panel at a fixed frequency.

4. The display device of claim 1, wherein, in response to the fingerprint sensor being operated, the panel driver is configured to drive only a partial area of the display panel at a fixed frequency.

5. The display device of claim 1, wherein, in response to the fingerprint sensor not being operated, the sensor driver is configured to output, to the sensing panel, an initial signal for searching whether or not a pen exists.

6. The display device of claim 5, wherein, in response to the fingerprint sensor not being operated, the sensor driver is configured to output a driving signal to the fingerprint sensor to correspond to a frame frequency of the display panel.

7. The display device of claim 1, wherein, in response to the fingerprint sensor being operated, the sensor driver is configured to drive the sensing panel in a mutual capacitance manner and a self-capacitance manner by changing a sensing cycle of the self-capacitance manner.

8. The display device of claim 1, wherein, the sensor driver is configured to output an initial signal for whether or not a pen exists to the sensing panel, and in response to the fingerprint sensor being operated, the sensor driver is configured to discontinue outputting, to the sensing panel, the initial signal for searching whether or not a pen exists.

9. The display device of claim 1, wherein, in response to the fingerprint sensor being operated, the sensor driver is configured to output a driving signal corresponding to a fixed frequency to the fingerprint sensor.

10. A method of driving a display device including a display panel including a sensing area having display pixels and sensing pixels, each display pixel comprising a plurality of sub-pixels, at least one sensing pixel is located outside a periphery of a corresponding one of the display pixels, a sensing panel overlapping the display panel and including sensing electrodes, and a fingerprint sensor overlapping the sensing panel, and configured with light emitting elements of the display pixels and light receiving elements of the sensing pixels, the method comprising:

determining whether or not the fingerprint sensor is operated;

driving the display panel, the sensing panel, and the fingerprint sensor in a first mode, in response to the fingerprint sensor not being operated; and driving the display panel, the sensing panel, and the fingerprint sensor in a second mode, in response to the fingerprint sensor being operated, wherein in the first mode, the sensing panel is driven in a self-capacitance manner and a mutual capacitance manner in response to the fingerprint sensor not being operated, and wherein in the second mode, the sensing panel is driven in the mutual capacitance manner in response to the fingerprint sensor being operated.

11. The method of claim 10, wherein, in the first mode, the display panel is driven at a variable frequency according to an image displayed on the display panel.

12. The method of claim 10, wherein, in the first mode, a driving signal is output to the fingerprint sensor to correspond to a frame frequency of the display panel.

13. The method of claim 10, wherein, in the second mode, the display panel is driven at a fixed frequency.

14. The method of claim 10, wherein, in the second mode, a partial area of the display panel is only driven at a fixed frequency.

15. The method of claim 10, further comprising, outputting an initial signal for whether or not a pen exists to the sensing panel, and in the second mode, discontinuing outputting the initial signal for searching whether or not a pen exists.

16. The method of claim 10, wherein, in the second mode, a driving signal corresponding to a fixed frequency is output to the fingerprint sensor.

* * * * *